United States Patent Office 3,845,100
Patented Oct. 29, 1974

3,845,100
PROCESS FOR CONVERSION OF PARA-XYLENE TO HIGH PURITY DIMETHYL TEREPHTHALATE
Meilute O. Kusak, Chicago, Ill., assignor to Standard Oil Company, Chicago, Ill.
No Drawing. Filed Feb. 13, 1970, Ser. No. 11,324
Int. Cl. C07c 69/82
U.S. Cl. 260—475 B        3 Claims

ABSTRACT OF THE DISCLOSURE

High purity dimethyl terephthalate in high yield is obtained from p-xylene, air and methanol by the following sequence of operating steps:

(a) liquid phase oxidation of p-xylene (99 mole percent purity) with air in the presence of acetic acid solvent and catalysis provided by one of the side chain initiators or promoters (acetaldehyde, methyl ketones or source of bromine) and a cobalt-containing metal oxidation catalyst soluble in acetic acid;

(b) treatment of aqueous solution of the resulting crude terephthalic acid product with hydrogen in the presence of metallic palladium under liquid phase conditions and after separation from catalyst solid terephthalic acid is obtained and separated from water;

(c) esterification of terephthalic acid resulting from (b) with methanol containing 0–5% water in the respective weight ratio of 1.0:3.0–10.0;

(d) precipitation of DMT from esterification reaction effluent at final temperature of 25–40° C. and 130–250 mm. Hg pressure;

(e) recovery of DMT washed with methanol containing 0–5% water; and (f) distillation of washed DMT.

BACKGROUND OF THE INVENTION

To start with p-xylene, air and methanol the preparation of high purity dimethyl terephthalate (DMT) required for fiber-forming polyester through tranesterification of DMT with a diol, e.g. ethylene glycol, has been conducted by several routes. One route involves partial oxidation of p-xylene to crude p-toluic acid product, esterification of crude p-toluic acid to its crude methyl ester, recovery of methyl p-toluate by distillation followed by oxidation of methyl p-toluate to methyl hydrogen terephthalate (mono-methyl terephthalate or MMT), recovery of crude MMT as bottoms product by distillation, esterification of crude MMT by further esterification with methanol to form an esterification product containing DMT and impurities, recovery of DMT by distillation of said esterification product to renew methanol, recover DMT and products which can be in part recycled to one of the foregoing steps. Each of said distillation recovery of separations represent a separate and distinct purification technique. Such a multi-step process is integrated and is economically and commercially useful for high purity DMT but is not sufficiently versatile and flexible to be adapted to the manufacture of fiber-forming polyester by elimination of one or more steps and recovering fiber-grade quality terephthalic acid as a free acid for direct reaction with a diol, e.g. ethylene glycol, for the production of fiber-forming polyesters.

A second route from p-xylene, air and methanol is economically and commercially useful for the production of high purity DMT required for fiber-forming polyester manufacture also is a multi-step route. But each step is individually conducted and has not without the addition thereof of further processing steps become or likely to become a fully integrated process with the advantages of being modified or adapted through the elimination of one or more of its steps and still using apparatus from the eliminated steps for the direct reaction of purified terephthalic acid of fiber grade as a reactant with a diol in the production of fiber-forming polyesters. This second route is conducted by first converting to terephthalic acid (TA) under liquid phase oxidation conditions p-xylene in the presence of acetic acid with a source of molecular oxygen and in the presence of catalysis provided by one of the side chain initiators and promoters, (e.g. acetaldehyde, methyl ketones or a source of bromine) and a metal oxidation catalyst such as cobalt, manganese, cerium or mixtures thereof. By appropriate known adjustment of ratio of acetic acid to p-xylene, concentrate of catalyst compounds, temperature and pressure, such liquid phase catalytic phase oxidation can be produced to provide high yields (above 90–95 mole percent) of crude terephthalic acid product as filter cake. Such crude terephthalic acid has just under about 1.0 weight percent of total impurities which are in general 4-carboxybenzaldehyde (4-CBA), p-toluic acid color bodies and color formers. In said crude terephthalic acid there are generally from 0.1 to 0.5 percent 4-CBA and 0.01 to 0.05 percent p-toluic acid on a weight basis. That crude terephthalic acid is then separately esterified with methanol used in an amount from 15 to 50 moles per mole of crude terephthalic acid at a temperature above 150° C. and under pressure conditions to maintain methanol in liquid phase. Crude terephthalic acid can also be esterified by injecting into a hot bed thereof methanol vapors at a temperature above the boiling point of DMT to provide a vapor product containing a mixture of DMT and methanol vapors from which crude DMT product is condensed at a temperature slightly above 140° C. and the condensate, said purified crude DMT can be purified by recrystallization from ethanol or xylene, the recrystallized DMT is then melted to remove the recrystallization solvent and then the liquid DMT is fractionated in two or more rectification towers to remove a low boiling fraction of about 5 to 15% of the liquid DMT feed and the remainder of the feed is further rectified to obtain a high purity DMT overhead product and to obtain a higher boiling MMT-containing fraction obtaining MMT useful for recycle to esterification. Whereas such a multi-step process has only the DMT purification and does produce high quality DMT in high yields, the various individual steps are not readily adaptable to true integration, the 5 to 15% low boiling impurity fraction tends to diminish potential DMT yields. Thus steps of this process are not readily eliminated nor can the apparatus used in the eliminated steps be advantageously used for obtaining high purity fiber-grade TA product and/or diol esterification product useful in the manufacture of fiber-forming polyesters.

Another route proposed for the preparation of DMT from p-xylene, air and methanol involves reacting these materials in a combination of liquid phase oxidation and esterification in said combination of oxidation-esterification. Catalysis is provided by a source of cobalt and a source of bromine. The use of a single combination oxidation-esterification results in somewhat low yields of DMT comingled with a multitude of other products. By a combination of two or more of said combined oxidation-esterification steps, separated by suitable removal of intermediate impurities between steps, increased yield of very impure ester product is obtained. For example, following the first oxidation-esterification its process effluent is distilled and fractionated to remove such products as water, methanol and methyl formate, methyl acetate and methylal to provide a feed for the second combined oxidation-esterification. The resulting mixture of products contains about twice as much DMT as is present in a single step process. Such use of two combinations of oxidation and esterification applied to o-xylene produced from the second combined oxidation-esterification a mixture containing in addition to metal compound impurities (about 1%) the following compounds:

Product component: Weight percent
- Dimethyl Phthalate _____ 18.9
- Methyl Orthotolutate _____ 4.8
- Monomethyl Phthalate _____ 23.7
- Methyl Benzoate _____ 2.1
- Phthalide _____ 8.7
- Orthotolualdehyde _____ 1.2
- Orthotoluic Acid _____ 3.8
- Orthoxylene _____ 0.2
- Orthoxylyl Alcohol _____ 0.8
- Methylal _____ 2.5
- Methyl Acetate _____ 1.5
- Methyl Acetate _____ 0.6
- Methanol _____ 18.7
- Water _____ 11.5

It is evident from the foregoing mixture of compounds, that the use of p-xylene in place of o-xylene would produce a like mixture of isomeric compounds and recovery of DMT from said mixture could be affected only through the use of several distillation and rectification steps. From such recovery of DMT there would remain for recycle to one of the preceding combinations of oxidation and esterification steps for further DMT production about 52% of said product components: methyl p-toluate, mono-methyl terephthalate, p-toluic acid, o-xylene, p-xylene alcohol and methanol. Also about 30% of the product component mixture so separated would have no use in further production of DMT and would represent a loss of starting materials otherwise being potentially useful for the production of DMT.

It is submitted that the foregoing use of two separate stages of combined oxidation-esterification would not lend itself to modification for eliminating of any one step whereby the apparatus therefrom could be used for obtaining high purity TA of fiber-grade quality or reacting it with ethylene glycol as the first step in the manufacture of fiber-forming polyesters.

A fully integrated process consisting of essential sequence of operating steps has now been devised for converting p-xylene and methanol to DMT in high yield impurity. This fully integrated process is not only efficient and unique but its simplicity indicates its uniqueness. The heart of this integrated process is the simplicity of esterification of TA and recovery of high quality DMT. Also until the technology and economics develop, a portion of the process can be first operated and high purity DMT can be produced as an item of commerce and sale to fiber-forming polyester manufacturers until the demand therefor increases warranting total integration back to p-xylene oxidation. Still later when the technology and economics, at the place the process is operating, advances to the use of high purity TA of fiber-grade quality, some of the later steps of integrated process can be eliminated and the apparatus put to other uses.

As used herein and as understood by those skilled in the art of manufacturing fiber-forming polyesters, the term "high purity" as applied to DMT indicates a DMT product having an acid number (milligrams KOH per gram of DMT product) in the range of 0.005 to 0.05, typically 0.01–0.03, and a freezing point in the range of 140.62 to 140.63, typically 140.623–140.625° C.

SUMMARY OF INVENTION

The fully integrated process for production of high purity dimethyl terephthalate (DMT) from p-xylene, air or other source of molecular oxygen and methanol consists essentially of the following sequential operations:

(a) liquid phase oxidation of p-xylene with molecular oxygen as oxidant in the presence of acetic acid as reaction solvent and in the presence of cobalt-containing catalyst, which can also contain maganese and/or cerium, in combination with side-chain oxidation initiater or promoter wherein the oxidation temperautre, weight ratio of acetic acid to p-xylene and concentration of catalyst components are selected in known manner to provide a crude terephthalic acid (TA) product having a total impurity content indicated by the concentrations of 0.1 to 0.6 percent 4-carboxybenzaldehyde (4-CBA) and 0.01 to 0.06 percent p-toluic acid, both on a weight basis;

(b) hydrogen treatment of an aqueous solution of said crude TA in the presence of liquid water and solid metallic palladium catalyst wherein hydrogen and catalyst are first separated from the treated liquid aqueous solution and then water is separated from crystalline TA product;

(c) esterification of said crystalline TA product with methanol of 0–5% water content in an amount of from 3.0 to 10.0 parts thereof per part of TA on a weight basis at a temperature above 190° C. for example in the range of 200–350° C. under a total pressure of 500 to 5000 pounds per square inch or 34 to 340 atmospheres;

(d) precipitation of DMT from the esterification product of (c);

(e) recovery of DMT washed with methanol of 0.5% water content; and (f) distilling washed DMT to recover high purity DMT.

EMBODIMENT OF THE INVENTION

A—Liquid Phase Oxidatioin: This procedural step can be conducted at temperatures varying from ambient temperature up to temperatures in the range of 200 to 230° C. depending upon the system of catalysis and concentration of catalyst components and p-xylene in reaction solvent. For this oxidation, catalysis is provided, as before mentioned, by oxidation metal-containing catalyst in combination with one of the side-chain oxidation initiators: acetaldehyde, methyl ketone or a source of bromine to provide catalyst systems. Those systems of catalysis are soluble in acetic acid. The metal portion of the catalyst is preferably used in the form of metal acetate which is conveniently available as metal acetate hydrate, e.g. cobalt acetate tetrahydrate. The metal-containing catalyst is preferably provided by the use of the acetate hydrate form of cobalt, manganese, cerium and mixtures thereof. The metal-containing catalyst, when used with the aldehyde or ketone organic initiator, have cobalt as the major metal component, i.e. 50 percent or more of the metal catalyst component calculated as cobalt metal.

Liquid phase conditions are maintainable at atmospheric pressure when reaction temperatures not exceeding 115–118° C. (boiling point of acetic acid) are used. Such low temperatures are useful for catalysis provided by cobalt acetate tetrahydrate and acetaldehyde, cobalt acetate tetrahydrate and methyl ethyl ketone and combinations of metal and bromine source wherein there is present about equal gram atomic amounts of metal and bromide. For these low temperature oxidations acetic acid solutions of 2 to 8% metal are used. Acetaldehyde and methyl ketones are used in from 2 to 6 moles per mole of p-xylene. The ratio of acetic acid to p-xylene on a weight basis useful is in the range of 3.0 to 10:1.0. The reaction rates are, of course, increased by use of temperatures up to 150° C. achieved by operation at superatmospheric pressure. Such higher temperatures and pressures increase reaction rate both by the effect of increased temperature and by higher permissable oxygen concentrations in the liquid phase reaction medium. These lower temperature oxidations can use air or commercial oxygen as the source of molecular oxygen oxidant.

As the reaction temperature is increased above 150° C., pressure to obtain liquid phase conditions are increased which provides for the advantageous use of air to obtain high oxygen concentrations in the liquid reaction medium. As temperature and said oxygen concentration increases, the concentration of the metal component and initiator can be decreased. For example, at 190 to 225° C. total metals concentration in acetic acid of 0.05 to 0.5 weight percent become exceptionally useful and initiator or promoter concentration in acetic acid can also be reduced. For example, the source of bromine need only provide 0.1 to 0.3 weight percent calculated as bromide ion but acetaldehyde and methyl ketone promoter-initiators are still required in about equi-molar proportions baseed on p-xylene. For said higher temperature oxidations 2.5 to 5.0 parts of acetic acid per part of p-xylene on a weight basis are used. The catalysis in acetic acid provided by ions of cobalt, manganese, cerium and mixtures thereof with bromine source is preferred because p-xylene conversions to TA and TA yields of 95–98 mole percent are obtainable in xylene residence time of 45–60 minutes for continuous oxidations without coproduction of excess quantities of additional acetic acid (e.g. from acetaldeyhde or methyl ethyl ketone) and the higher pressures involved to retain acetaldehyde or methyl ethyl ketone in the liquid phase.

As mentioned before, said oxidations can be conducted under their best suited conditions of temperature, pressure, catalyst component concentration and ratio of acetic acid to p-xylene to provide a crude TA having impurity content indicated by 0.1 to 0.5 percent 4–CBA and 0.01 to 0.05 percent p-toluic acid on a weight basis. There are also present in the crude TA other impurities of the color body and color-former types. However, by indicating the concentrations of 4–CBA and p-toluic acid impurities the attendant other impurities are to those skilled in this art thereby indicated.

For the purposes of this oxidation step the use of p-xylene of at least 99 mole percent pure is required. The impurity is mainly m-xylene (0.05%) with smaller amounts of o-xylene (about 0.2%) and ethylbenzene (0.1–0.2%) whose oxidation products are quite soluble in acetic acid mother liquor (90–100° C.) from which crude TA is recovered.

B—Hydrogen Treatment: This procedural step can be conducted in known manner in the presence of metallic palladium, preferably metallic palladium dispersed on the surface of activated carbon of low content of other elements known to poison palladium for example sulfur and copper among others. Two of the useful techniques use water as a carrier for crude TA. One technique uses water to carry crude TA sublimed from solid crude TA. The other technique uses liquid water as solvent for crude TA at temperatures upward from 225° C., e.g. in the range of 250 to 315° C. to carry crude TA in commercially feasible processing quantities. Both techniques use only a small amount of hydrogen per pound of crude TA processed, for example about 0.01 to 0.1, preferably 0.03 to 0.06, mole hydrogen per mole of TA in the crude TA and even then not all the hydrogen is consumed. For such hydrogen treatment techniques when used for production of fiber-grade TA ("fiber-grade TA" is the product reacted directly with a diol such as ethylene glycol in the manufacture of fiber-forming polyesters), product the manner of conducting TA precipitation and separation of water from TA crystals after catalyst removal is important. The same controls for TA crystal formation and separation of water therefrom is not important for the purposes of this fully integrated combination process as will be later explained because TA with 150 p.p.m. up to 6000 p.p.m. p-toluic acid and 5–50 p.p.m. 4–CBA can be used in the esterification.

Said controls for production of fiber-grade TA are to maximize p-toluic acid retention in water as solute. The 4–CBA impurity is reduced substantially by said hydrogen treating techniques to p-toluic acid leaving a small amount of 4–CBA not so reduced. For this process of fully integrated sequential process steps, p-toluic acid in the range of 150–6000 p.p.m. and non-reduced 4–CBA in the range of 5–10 p.p.m. impurities can be associated with TA recovered because those impurities are also esterified with methanol and their resulting esters removed by simple distillation as seen from the following 760 mm. Hg. boiling points of the methyl esters:

|  | ° C. |
|---|---|
| DMT | 287.8–287.9 |
| Methyl p-toluate | 219 |
| Methyl ester of 4–CBA | 265 |

C—Methanol Esterification: This esterification step is preferably carried out preferably with 3 to 10 parts methanol per part of TA at temperatures above 190° C., e.g. 200–350° C., and at pressures of 500 to 5000 p.s.i.a. (34–340 atmospheres). It is preferred to conduct the esterification in the presence of a solid catalyst which speed up esterification of TA but do not accelerate ether formation from the alcohol. Excessive ether formation is known to be undesirable. Preferred among known esterification solid catalysts are metallic zinc, zinc oxide, zinc acetate, cadmium sulfate, oxides and acetates of cobalt, copper and manganese and of these metallic zinc and zinc oxide are most preferred.

Important and essential to the present inventive integrated process and especially to the production of crude DMT from which there can be easily separated high purity DMT is the use of esterification techniques wherein the esterification is first conducted in a turbulent zone to keep TA suspended until MMT forms followed by completion in a quiescent zone which prevents mixing with first zone materials, permits high carboxyl conversion to ester group and solid catalyst separation. These zones provide about equal residence time therein of the reaction mixture. Esterification product is withdrawn from the quiescent zone. The amount of catalyst used based on TA is in the range of 0.1–0.5, preferably 0.2–0.3, weight percent.

The use of 3 to 10 weight parts of methanol per part of TA in the esterification gives high esterification equilibrium (to at least about 94–95% conversion of carboxylic acid groups to methyl ester groups) in a relatively short time, e.g. 40–70 minutes and permits retention of methyl ester impurities in alcohol mother liquor during DMT precipitation and recovery. For example 94% conversion of carboxylic acid groups to methyl ester groups provides 11.2% MMT in DMT product on weight basis. Said amount of methanol provides sufficient solvent to dissolve MMT as well as DMT.

DMT Recovery by Precipitating, Washing and Drying

These steps D to F together with esterification conditions are part of the heart of this invention. By subjecting the total esterification effluent to single stage crystallization to a final temperature of 25–40° C. at 130–250 mm. Hg. pressure a slurry of DMT in methanol solution of MMT and some of other esters can be obtained. The recovery of 95–100% methanol from said methanol mother liquor can be accomplished in a known manner, for example, fractionation. Residue from that fractionation contains MMT and DMT and thus a major (50–70%) of the residue can be recycled back to the esterification as a means for minimizing DMT loss. Precipitated DMT is recovered by any means for effecting separation of solids and liquids, for example, filtration, classification and centrifugation. The separated DMT crystals are washed with 0.05–1.0 parts methanol (1–5% water) per part DMT by weight to remove adhering moth liquor. The wash liquor can be used as part of the methanol for esterification. The washed DMT crystalline product is then subjected to distillation to remove adhering methanol and remove methyl p-toluate and methyl ester of 4–CBA and recover high purity DMT.

To demonstrate the flexibility of the present inventive process methanol esterification step and subsequent DMT recovery steps can be eliminated. The integrated process is then operated through recovery of TA from the catalytic hydrogen treatment of aqueous solution of crude TA. In this case the controlled TA precipitation and recovery are exercised to recover dry TA product having 5–10 p.p.m. 4–CBA and 50–150 p.p.m. p-toluic acid. Such dry TA with ethylene glycol in the respective molar ratios of 1.0 to 1.5 to 5.0 are preheated to a temperature above boiling point of ethylene glycol (197.5° C.) and under pressure to retain it in the liquid phase. Suitable temperatures are 200 to 300° C. Preferably this esterification is conducted and the pressure equal to the autogenetic pressure generated in a closed system by vapors of glycol, esters and by-product water until a clear fluid product is obtained. Such esterification of TA with glycol is advantageously conducted in the same apparatus used for methanol esterification of TA wherein thereare the turbulent and quiescent zones. The clear fluid esterification product can be subjected to crystallization by effecting part of the cooling by evaporation of by-product water and glycol resulting in depressurizing to a pressure down to 300 to 500 mm. Hg. Thereafter by further heating to 250–280° C. and depressuring down to 0.1 to 0.5 mm. Hg removal of unreacted glycol and glycol splitting out by polycondensation can be effected until a polyester of intrinsic viscosity of 0.3 to 0.9 is obtained. Such polyesters (0.3–0.5 intrinsic viscosity) are suitable for film manufacture and (0.5 to 0.9 intrinsic viscosity) are suitable for fiber manufacture.

Operation of the process of this invention with various unused portions will be described to further illustrate its practice.

Example 1

First the unique simple preparation of high quality DMT is exemplified using TA having 5 p.p.m. 4–CBA and 150 p.p.m. p-toluic acid.

A slurry is prepared from reactants used in the proportions of 830 pounds of that TA in 4150 pounds methanol containing 3% water and 0.4 pounds catalyst is prepared using fresh methanol, methanol recovered from crystallization mother liquor, methanol wash liquor from washing crystalline DMT and methanol recovered from drying washed DMT. Part of the catalyst is provided by recycle of MMT and DMT separated as residue from recovery of methanol from mother liquor. This slurry is continuously heated to 260° C. and pressurized to 1900 p.s.i.g. and then introduced into an esterification reactor filled with reaction product having a turbulent zone where feed enters and a quiescent zone where esterification effluent is withdrawn. After a reactant residence time of 40–50 minutes the fluid effluent withdrawn from the quiescent zone contains DMT and MMT equivalent to esterification of 95–97% of the total carboxylic acid groups to methyl ester groups.

The liquid effluent on an hourly basis, about 5805 pounds, contains 4466 pounds methanol, 262 pounds water, 987.5 pounds DMT, 90 pounds MMT and small amounts of dissolved metal salt from catalyst and methyl esters of 4–CBA and p-toluic acid. The liquid effluent is heat exchanged with pressurized TA slurry in methanol flowing to the esterification reactor. The effluent is partially cooled in this manner. The partially cooled liquid effluent (about 120° C.) is further cooled to a temperature of about 27–28° C. to precipitate crystalline DMT. The resulting methanol mother liquor contains about 50 pounds DMT and all the MMT and methyl esters of 4–CBA and p-toluic acid. The crystalline DMT is recovered by continuous centrifugal filters wherein DMT cake is washed with methanol (2–3% H$_2$O) recovered from methanol mother liquor. This methanol wash is used to make esterification reaction TA slurry. In this way 1102 pounds of wet DMT (937 pounds dry basis) are obtained. This set DMT is distilled to recover DMT which has an acid number of 0.03 and a freezing point of 140.623° C.

Example 2

The process of this invention is next illustrated by way of starting with crude TA having about 1.0 weight percent impurities of which 4–CBA is the major impurity. Such a product is obtainable from any of the liquid phase processes before described using in their catalyst systems one of the side-chain oxidation initiators (bromine, acetaldehyde or methyl ethyl ketone) in combination with oxidation metal catalysts (cobalt, manganese and cerium) before described.

A slurry of such crude TA in water is prepared containing 20 weight percent solids at ambient temperature (25–30° C.). This slurry is heated to the temperature of about 5 to 10° C. above the saturation temperature (about 270° C.) and pressurized to a pressure (about 54 atmospheres) at which water remains in the liquid phase at such temperature. This hot pressurized solution and hydrogen are combined and are permitted to flow a bed of particulate catalyst of 0.5% palladium on charcoal at that temperature and pressure. Unused hydrogen is removed from the liquid effluent from the catalyst bed. The hydrogen free solution is filtered to remove catalyst and then cooled to precipitate TA at the temperature of 102–105° C. and 2 to 5 p.s.i.g. pressure. The precipitate is separated from liquid aqueous mother liquor, washed with water and dried.

The esterification and DMT recovery processes of Example 1 are repeated using the above obtained washed and dried TA in the hourly rate of 830 pounds (5.0 pound moles) to produce 937 pounds (dry basis) of high purity DMT.

Example 3

As feed for preparation of terephthalic acid there are combined in an hourly basis 366 pounds (3.35 pound moles) p-xylene (99%-pure) 1100 pounds acetic acid (95% acid and 5% water on weight basis) and cobalt and manganese acetate tetrahydrates to provide 0.94 pound total metal (calculated as metal ions) and source of bromine to provide 1.3 pounds bromine calculated as bromide ion. The acetic acid comes from solvent recovery later described. Said feed slurry charged into an oxidation reactor and compressed air is also introduced into the oxidation reactor containing liquid phase reaction mixture at a temperature of 225° C. and a pressure of about 400 p.s.i.g. Air is introduced to provide on an hourly basis a slight excess of oxygen over the 10.35 moles oxygen required for 366 pounds xylene per hour sufficient to provide 1–2% O$_2$ by volume in the exhaust gas on acetic acid free basis. The gaseous mixture generated from said liquid phase mixture by heat of reaction exits oxidation reactor, is condensed and the condensate is recycled into the oxidation reactor 20.

Fluid reaction effluent is discharged from the oxidation reactor to crystallization conducted to a final temperature of 90–100° C. and atmospheric pressure. The precipitated TA solids are collected (e.g. filtering, classifying or centrifuging) and washed with makeup acetic acid. Mother and wash acetic acid liquors containing catalyst components are distilled and fractionated to recover 95% acetic acid (5% water). Wet crude TA is dried. The dried product, containing about 1.0% impurities, is used in the process of Example 2.

The invention claimed is:

1. A preparative process for high purity dimethyl terephthalate having an acid number in the range of 0.01 to 0.03 and a freezing point in the range of 140.62 to 140.63° C. by the operating sequence: esterifying terephthalic acid having 50 p.p.m. 4-carboxybenzaldehyde or less and 160–6000 p.p.m. p-toluic acid with methanol having 0–5% water in the respective reactant weight ratio of 1.0:3.0 to 10.0 at a temperature in the range of 200 to 300° C. and a pressure in the range of 500 to 5000 p.s.i.g.; precipitating dimethyl terephthalate at a final temperature of 25–40° C. and a pressure of 130–250 mm. Hg.; separating dimethyl terephthalate precipitate from methanol mother liquor; washing the separated precipitate with methanol having 0–5% water and distilling the washed precipitate to remove as overhead fractions residual methanol and methyl esters of p-toluic acid and 4-carboxybenzaldehyde leaving as residual product high purity dimethyl terephthalate.

2. The process of claim 1 wherein the terephthalic acid reactant is obtained by catalytic hydrogen treatment of liquid aqueous solution of crude terephthalic acid containing 1.0 percent total impurities, wherein the impurities consist essentially of color bodies, color formers and 0.1 to 0.6 percent 4–CBA and 0.01 to 0.06 percent p-toluic acid based on the weight of said crude terephthalic acid, in the presence of a metallic palladium catalyst; separation of treated solution from catalyst; precipitation of terephthalic acid crystals from separated solution and removal of liquid aqueous mother liquor from the precipitate wherein said precipitation of crystals and removal of mother liquor are conducted at a temperature within the range of 100 to 150° C. and drying said recovered precipitate.

3. The process of claim 2 wherein said crude terephthalic acid is obtained as the solid product separated from the fluid effluent obtained by the catalytic liquid phase oxidation of p-xylene of at least 99% purity with air.

References Cited

UNITED STATES PATENTS

| | | | |
|---|---|---|---|
| 3,073,754 | 1/1963 | Aroyan et al. | 260—475 |
| 3,076,019 | 1/1963 | Baldwin | 260—475 |

FOREIGN PATENTS

| | | | |
|---|---|---|---|
| 873,913 | 8/1961 | Great Britain | 260—475 |
| 994,769 | 6/1965 | Great Britain | 260—525 |

LORRAINE A. WEINBERGER, Primary Examiner

E. J. SKELLY, Assistant Examiner

U.S. Cl. X.R.

260—475 R, 525

PO-1050
(5/69)

UNITED STATES PATENT OFFICE
CERTIFICATE OF CORRECTION

Patent No. 3,845,100  Dated  October 29, 1974

Inventor(s) Meilute O. Kusak

It is certified that error appears in the above-identified patent and that said Letters Patent are hereby corrected as shown below:

| Col. | Line | |
|---|---|---|
| 1 | 41 | "tranesterification" should be -- transesterification -- |
| 2 | 2 | "terepht-" should be -- tereph- -- |
| 3 | 16 | "Methyl Acetate 1.5" should be -- Methyl Formate 1.5 -- |
| 4 | 2 | "initiater" should be -- initiator -- |
| 4 | 23 | "0.5%" should be -- 0-5% -- |
| 4 | 28 | "Oxidatioin" should be -- Oxidation -- |
| 5 | 8 | "baseed" should be -- based -- |
| 5 | 33 | "(0.05%)" should be -- (0.5%) -- |
| 5 | 73 | "5-10 ppm" should be -- 5-50 ppm -- |
| 6 | 9 | Remove first use of "preferably" |
| 6 | 62 | "0.05" should be -- 0.5 -- |
| 6 | 63 | "moth" should be -- mother -- |
| 7 | 3 | "above" should be -- above the -- |
| 7 | 12 | "thereare" should be -- there are -- |
| 8 | 66 | "160" should be -- 150 -- |

Signed and sealed this 7th day of January 1975.

(SEAL)
Attest:

McCOY M. GIBSON JR.
Attesting Officer

C. MARSHALL DANN
Commissioner of Patents